MAGNETIC INDENTIFICATION CODE RECORDING

Filed Oct. 31, 1963 2 Sheets-Sheet 1

DONALD S. OLIVER
INVENTOR.
BY
ATTORNEYS

Sept. 5, 1967 D. S. OLIVER 3,340,538

MAGNETIC INDENTIFICATION CODE RECORDING

Filed Oct. 31, 1963 2 Sheets-Sheet 2

DONALD S. OLIVER
INVENTOR.
BY Stanley Belsky
Lawrence P. Benjamin
ATTORNEYS

United States Patent Office 3,340,538

Patented Sept. 5, 1967

3,340,538
MAGNETIC IDENTIFICATION CODE RECORDING

Donald S. Oliver, West Acton, Mass., assignor to Itek Corporation, Lexington, Mass., a corporation of Delaware Filed Oct. 31, 1963, Ser. No. 320,476
6 Claims. (Cl. 346—74)

ABSTRACT OF THE DISCLOSURE

This disclosure illustrates a planar magnetizable media for bearing magnetically recorded information bits which are induced therein by a needle shaped magnetic pole piece applied adjacent the edge of the media.

This invention relates to magnetic data processing and more particular to an apparatus for recording information onto a magnetic strip in such a manner as to allow the recorded information to be read from the edge of the strip.

The science of data storage and its subsequent retrieval from a magnetic medium is well known hence no detailed exegesis is necessary. The most familiar of the storage and retrieval techniques is that of recording and reading data signals from magnetic wire or magnetic tape arranged as a continuous ribbon of material which is advanced from one reel to another. In a similar manner, by putting a strip of magnetic material on cinemaphotographic film, it is possible to correlate a sound track recorded on the strip with motion of the image frames.

Data storage of film is, of course, also well known and microfilming of graphic information is now conventional. In its usual embodiment, information is reduced 30–50 times and arranged in an array of discrete frames on the continuous film ribbon and wound on a reel. Location of a particular frame on the reel in the simplest applications is performed by manual operations and visual observation until the desired data is brought into view. A more sophisticated technique employs a reel of film having a magnetic strip along one edge. This strip has data recorded thereon identifying the adjacent or a nearby image frame. An associated mechanism may be connected to the magnetic transducer sensing the identification data to stop the reels and present a preselected frame to the viewer on a projection screen.

Because of the obvious inconvenience of storing data which is subject to random retrieval on reels, various attempts have been made to divide the image frames into film segments or film chips which individually can be stored in a compact array. In one system, individual microfilm segments are secured to or made part of, a punched card and are handled by familiar punched card sorting techniques. In another current system, identification data is put on the film surface in the form of an optically scanned digital code. A major disadvantage of such a system is that it requires that at least part of the surface of each chip be made accessible during identification scanning. This is time consuming since it increases the time required to search a given store and probably most important, increases the mechanical complexity while simultaneously exposing the film surfaces to abrasion and thereby hastening their deterioration. Precisely the same drawbacks would exist even if the film chip had an identification magnetic strip, coded in the conventional manner. As with an optically sensed coded surface, conventional recording on a magnetic strip would require access to the surface of the strip.

A simple analogy may be made by a reference to the technique of searching for a particular book title out of a multitude of books arranged in the usual manner on shelves. Assuming the books had no identification on the spines, if each book had to be removed, even partially, from the shelf in order to observe the tile on the front cover, the rapidity of such a search would be extremely limited making retrieval time for a particular title excessive. It is obviously far more convenient and considerably faster to scan the title or identification numbers from the spine surfaces which are exposed, side-by-side, on the shelves. In a comparable manner, scanning a multitude of discrete, information bearing sheets such as film chips, which are stacked in a closely packed array, by reading an identification code off the chip edges provides a more rapid search means as well as immediate access to a predetermined chip. However, the prior art conventional magnetic recording and reading techniques cannot, with any degree of certainty, accomplish an unambiguous sensing of magnetic information from the edge of a magnetic strip.

In my Patent 3,293,629, issued Dec. 20, 1966, entitled "Planar Media Magnetic Code Identification System," which is a continuation of abandoned application No. 21,754 filed Apr. 12, 1960, and assigned to the assignee of the subject application, I disclose therein an apparatus and a method of recording information on a magnetizable strip and a method of sensing the magnetic data that has been recorded thereon. While my prior application is entirely satisfactory, I have found still another apparatus and method of recording information on a magnetic strip which allows a considerably higher density of bits of information to be recorded in the same area.

Basically in a system of this sort, one of the problems that must be solved is finding means for recording magnetic, binary-code bits along one edge of magnetic strip so that in a subsequent reading step, the recorded information can be sensed by a magnetic reading head located at some distance from the strip edge. As shown in my prior application, the method described therein is such that when the information is recorded on the strip surface, a pair of recording poles are brought up in contact with the strip to create a corresponding pair of surface poles with one of the two resultant surface poles locating adjacent the edge. The distance from the edge-located surface pole to the reading head must be less than the distance between the inner pole and the reading head. While there is no particular difficulty in achieving this result, it is, nevertheless, necessary to maintain spacing of this order of magnitude to prevent the fields of the poles from cancelling each other in the reading head. Since the distance between surface poles is equal to the distance between the recording head poles, a fairly large (by comparison) recording head gap is required. As a result, the side fringing effect limits the ultimate packing density in the recording medium.

In the present invention, considerably more bits of information are packed into a small area by essentially shaping the magnetic field produced and by producing only one surface pole on the material with the other pole uniformly distributed around it.

It is therefore, an important object in the present invention to provide apparatus for recording an identification code in the magnetic medium.

Another important object of the present invention is to provide an apparatus for recording an identification code in the magnetic medium at the outer edge thereof so that it may be sensed along the edge.

Still another important object of the present invention is to provide an apparatus for recording a higher density of magnetic information in a magnetic medium than has been heretofor possible.

In accordance with the present invention, there is provided a recording head pole, needle-like in shape, that is impressed against the recording medium to induce a highly concentrated surface pole and thereby to produce magnetic fields at an edge of the medium that extends radially from the surface pole with the other pole uniformly distributed around the pole.

The features of my invention which I believe to be novel are set forth with particularity in the appended claims. My invention itself, however, both as to its organization and method of operation, together with further objects and advantages thereof, may best be understood by reference to the following description taken in conjunction with the accompanying drawings, in which:

Figure 1A:
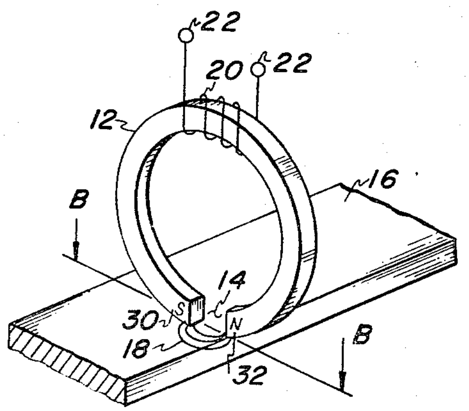
FIG. 1A is a perspective view of a prior art method of creating magnetic fields in a magnetizable medium.
Figure 1B:
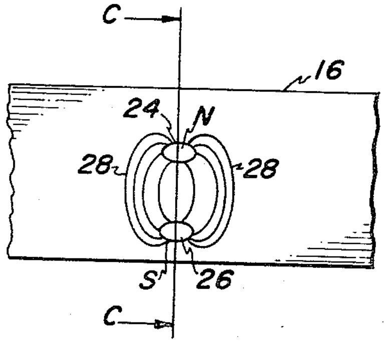
FIG. 1B is a plan view of the embodiment of FIG. 1A taken along lines B—B.
Figure 1C:
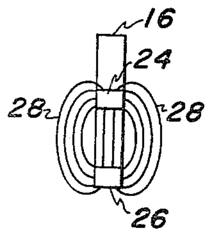
FIG. 1C is a cross-sectional view of the magnetic medium taken along lines C—C of FIG. 1B.

Referring now to FIGS. 1A, 1B, and 1C for a discussion of the prior art, it is understood that the recording medium 16 is a material capable of being magnetized and is also capable of retaining the magnetic fields induced therein after the recording head 12 is removed. Recording head 12 is provided with a gap 14 and, by means of coil 20 attached to an appropriate source of energized means 22, produce the magnetic lines of flux 18 as indicated. Gap 14 is bounded by the pole 30 here indicated as south and pole 32 here indicated as north.

Having energized the recording head 12, and maintaining the head 12 in position for an appropriate length of time, strip 16 has induced therein a pair of surface poles 24 and 26. It being understood that the magnetic lines of force, herein indicated as 28, extend from one pole to the other on both sides thereof. While the lines of force are indicated as extending in a plane extending across the width of the strip 16, FIG. 1B, it should be understood that they also extend beyond the edge of surface of strip 16, as shown in FIG. 1C. It is this fringing flux that extends beyond the edge of the recording medium 16 that is sensed by the sensing head as described in my copending application.

While this method is entirely satisfactory, it has been found that the distance from the pole 26 to a suitable sensing head must be considerably less than the distance from surface pole 24 to the reading head. These parameters must be maintained otherwise the fields from the surface poles will cancel each other in the reading head. Since the distance between surface poles 24 and 26 are equal to the distance between recording poles 30 and 32, a relatively large recording head gap 14 is required. This large recording head gap 14 then increases the side fringing (18) which limits the ultimate packing density of the information bits since any intermingling of fringing fields on adjacent bits will cause ambiguities in the sensing head.

Referring now to FIGS. 2A, 2B, 2C, 2D and 2E of my novel device it will be seen that my recording means 212 is provided with a pair of sharp, needle-like pole pieces 232 and 230 labelled North and South respectively defining gap 214.

When coil 220 is energized by a suitable source connected to terminal 222, the fringing magnetic field 218 is created. The recording medium 216 is maintained in very close proximity to one of the poles inducing magnetic field 218 therein as indicated by FIG. 2B. Once the energizing source is removed, the lines of force extending along gap 214 no longer exist. However, it is well known that vertical components of magnetization will, in this instance, be negligible and will cancel out due to the self demagnetization properties inherent in any thin material of the order used in this instance. Since any vertical components will cancel out, only those lines of force 218 that cut through material 216 at an angle other than perpendicular to the two broad surfaces of material 216 can be utilized. The diagonal lines of force may all be said to have vertical and horizontal components. Since all vertical components will cancel out, the remaining lines of force will be in a horizontal plane that is, parallel to the broad surfaces of material 216. These horizontal components **218*a* are shown in FIG. 2C as extending radially from the surface pole created in material 216 immediately adjacent pole piece 232**.

Figure 2A:
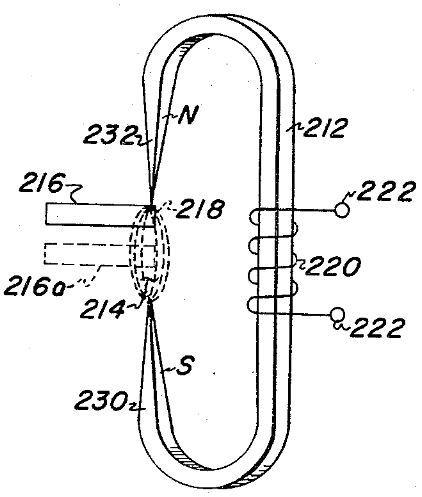
FIG. 2A is a side elevation view of my novel recording head.
Figure 2B:
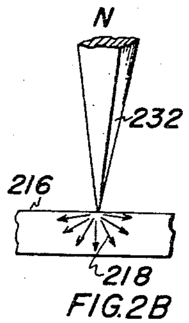
FIGS. 2B and 2C are partial, sectional, elevational views of my invention showing an enlarged, closeup view of the recording head and recording medium.
Figure 2C:
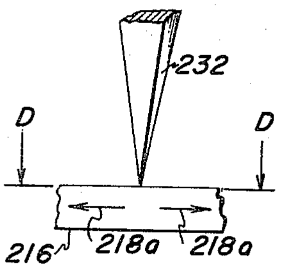

Thus, to create the radial field in the magnetizable material 216, it will be necessary to maintain the material in the position shown in FIG. 2A. To do otherwise, that is to maintain the magnetizable material at position 216A would not produce the same results since, as will be noted, the lines of force principally cut the material in a direction normal to the broad surface.

It should also be noted that it is preferable to maintain the needle-like pole piece 232 with its axis normal to and adjacent the broad surface. To do otherwise, would produce an excessively large surface pole in material 216 thereby defeating the purpose of my invention.

Figure 2D:
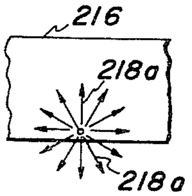
FIG. 2D is a plan view of the recording medium taken along lines D—D FIG. 2.
Figure 2E:
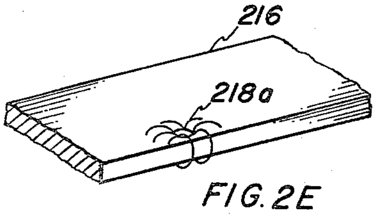
FIG. 2E is a perspective view of the recording medium after it has been acted upon by my novel device.

While these lines of force **218*a*** extend radially out from the surface pole, they will assume the shape shown in FIGS. 2D and 2E and thus are no longer subject to the requirement of maintaining minimum distance between surface poles as required by the prior art.

While I have described what is presently considered the preferred embodiment of my invention, it will be obvious to those skilled in the art that various other changes and modifications may be made therein without departing from the inventive concept, and, it is aimed in the appended claims to cover all such changes and modifications as fall within the true spirit and scope of my invention.

What I claim is:

1. A magnetic recording device for producing a radial magnetic field comprising:

a substantially circular recording head having a pair of widely spaced pole pieces, both of which have needle shaped portions with the point defining a gap;

means energizing the recording head to produce opposing polarities in each needle shaped portion; and a relatively thin film of magnetizable material in the gap and in close proximity to only one needle shaped portion.

2. A magnetic recording device for producing a radial magnetic field comprising:

a substantially circular recording head having a pair of widely spaced pole pieces both of which have needle shaped portions with the point defining a gap;

means energizing the recording head to produce opposing polarities in each needle shaped portion; and a relatively thin film of magnetizable material having a pair of broad parallel surfaces, one surface being normal to and in close proximity to only one needle shaped pole piece.

3. A magnetizable planar media having an edge thereof and including a first concentrated magnetic pole recorded in said magnetizable media adjacent said edge, and a second relatively un-concentrated opposite pole recorded in said magnetizable media diffusely magnetized adjacent said first highly concentrated pole for producing magnetic flux between said first pole and said second pole which extends beyond the edge of said magnetizable media to be sensed by a transducer spaced apart from said magnetizable planar media.

4. The combination as set forth in claim 3 wherein said planar media comprises an elongated magnetizable strip bearing a plurality of pairs of said first and second poles manifesting a media identification code.

5. The combination as set forth in claim 3 wherein said second un-concentrated opposite pole at least partially surrounds said first highly concentrated magnetic pole to produce magnetic flux radially extending between said first pole and said second pole.

6. The combination as set forth in claim 5 wherein said planar media comprises an elongated magnetizable strip bearing a plurality of pairs of said first and second poles manifesting a media identification code.

References Cited

UNITED STATES PATENTS 2,840,440 6/1958 McLaughlin et al. -- 340—174.1

BERNARD KONICK, *Primary Examiner.*

A. I. NEUSTADT, *Assistant Examiner.*